United States Patent
Hamid

(10) Patent No.: US 7,203,347 B2
(45) Date of Patent: Apr. 10, 2007

(54) METHOD AND SYSTEM FOR EXTRACTING AN AREA OF INTEREST FROM WITHIN A SWIPE IMAGE OF A BIOLOGICAL SURFACE

(75) Inventor: Laurence Hamid, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 669 days.

(21) Appl. No.: 10/155,004

(22) Filed: May 28, 2002

(65) Prior Publication Data

US 2003/0002718 A1    Jan. 2, 2003

Related U.S. Application Data

(60) Provisional application No. 60/300,832, filed on Jun. 27, 2001.

(51) Int. Cl.
*G06K 9/00* (2006.01)
*G05B 19/00* (2006.01)

(52) U.S. Cl. .................. 382/124; 340/5.53; 902/3; 713/186

(58) Field of Classification Search ........ 382/124–127, 382/115–123; 340/5.52, 5.53; 713/186; 902/3

See application file for complete search history.

(56) References Cited

U.S. PATENT DOCUMENTS

| | | | |
|---|---|---|---|
| 4,933,976 A * | 6/1990 | Fishbine et al. ............ 382/127 |
| 5,230,025 A * | 7/1993 | Fishbine et al. ............ 382/127 |
| 5,337,369 A | 8/1994 | Shibuya |
| 5,467,403 A * | 11/1995 | Fishbine et al. ............ 382/116 |
| 5,748,766 A * | 5/1998 | Maase et al. ............... 382/124 |
| 6,263,091 B1 * | 7/2001 | Jain et al. .................. 382/125 |
| 6,317,508 B1 * | 11/2001 | Kramer et al. ............. 382/124 |
| 6,330,345 B1 * | 12/2001 | Russo et al. ............... 382/115 |
| 6,333,989 B1 * | 12/2001 | Borza ........................ 382/124 |
| 6,459,804 B2 * | 10/2002 | Mainguet ................... 382/124 |
| 6,483,932 B1 * | 11/2002 | Martinez et al. ........... 382/124 |
| 6,785,408 B1 * | 8/2004 | Setlak et al. ............... 382/125 |
| 2002/0012455 A1 * | 1/2002 | Benckert ..................... 382/124 |
| 2002/0172402 A1 * | 11/2002 | O'Gorman et al. ......... 382/126 |

FOREIGN PATENT DOCUMENTS

| | | |
|---|---|---|
| EP | 0 855 667 A2 | 1/1998 |
| EP | 0 929 050 A2 | 1/1999 |
| EP | 1 011 285 A1 | 12/1999 |
| WO | WO 98/11750 A2 | 3/1998 |
| WO | WO 98/58342 A1 | 12/1998 |

* cited by examiner

*Primary Examiner*—Jingge Wu
*Assistant Examiner*—Aaron Carter
(74) *Attorney, Agent, or Firm*—Woodcock Washburn LLP

(57) ABSTRACT

Disclosed is a biometric imaging device a method of processing images of biometric surfaces that are captured using said imaging device. According to the instant invention, an image of a biometric surface presented by an individual is captured by a sensor of the imaging device, either as a single image or as a plurality of overlapping image portions that are combinable to form a single composite image. The imaging device also includes a memory buffer for retrievably storing image data relating to the image of the biometric surface. A processor of the imaging device is provided for analyzing the stored image data to determine a location of a feature of interest and for providing an output image of a known size and shape for use by a host system that is in communication with the imaging device for identifying the individual.

32 Claims, 16 Drawing Sheets

METHOD AND SYSTEM FOR EXTRACTING AN AREA OF INTEREST FROM WITHIN A SWIPE IMAGE OF A BIOLOGICAL SURFACE

This application claims the benefit from U.S. Provisional Application No. 60/300,832 filed on Jun. 27, 2001.

FIELD OF THE INVENTION

This invention relates generally to biometric imaging devices and more particularly to a method of processing images captured using said imaging devices.

BACKGROUND OF THE INVENTION

Biometric techniques for determining the identity of individuals are being used increasingly in authentication, recognition, and/or access systems. These techniques use biometric identifiers or human characteristics to verify or identify an individual. The fact that most human characteristics are unique to each individual, are difficult to reproduce by others, and are easily converted to electronic data, is particularly advantageous in biometric identification applications.

Historically, fingerprints have been the most widely used biometric identifiers, as is evident from law enforcement's extensive use of fingerprinting. The recent trends in biometric identification have been toward automating the above-mentioned authentication, recognition, and/or access systems. Most current techniques rely upon correlation methods that use automated detection systems connected to a computer database, for comparing detected biometric data to biometric data stored in the database, to confirm or determine the identity of an individual. Such automated systems have been used to identify individuals before granting access to cars, computers, home or business offices, hotel rooms, and in general, any sensitive or restricted area.

Various optical devices are known which employ prisms upon which a finger whose print is to be identified is placed. For example, the prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404.

An alternative type of contact imaging device is disclosed in U.S. Pat. No. 4,353,056 in the name of Tsikos issued Oct. 5, 1982, herein incorporated by reference. The imaging device that is described by Tsikos uses a capacitive sensing approach. To this end, the imaging device comprises a two dimensional, row and column, array of capacitors, each comprising a pair of spaced apart electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors.

A further contact imaging device is described in U.S. Pat. No. 5,325,442 in the name of Knapp, issued Jun. 28, 1994, herein incorporated by reference. Knapp discloses a capacitance measuring contact imaging device in the form of a single large active matrix array, formed by the deposition and definition by photolithographic processes of a number of layers on a single large insulating substrate. Electrodes and sets of address conductors formed of metal and field effect transistors are formed as amorphous silicon or polycrystalline silicon thin film transistors (TFTs) using an appropriate substrate of, for example, glass or quartz.

Additionally, a fingerprint sensing device and recognition system that includes an array of closely spaced apart sensing elements, each comprising a sensing electrode and an amplifier circuit, is described in U.S. Pat. No. 5,778,089 in the name of Borza, issued Jul. 7, 1998, herein incorporated by reference.

"Swipe imagers" are also known, wherein an individual places a fingertip into contact with a surface of a contact imaging device and then draws, or "swipes", the fingertip across a sensing portion of the surface. Images from adjacent portions of the fingertip are captured and combined in order to construct a composite image of the fingertip having an area that is greater than the area of a single captured image. In this way, an area of the fingertip that is substantially larger than the sensing portion is imaged. Such an arrangement allows a smaller capacitive fingerprint scanner to be used, which is advantageous due to lower manufacturing costs, improved robustness, and so forth. Also, the small area required is highly advantageous for embedded applications such as with a cell phone, a telephone, a computer (laptop) and so forth.

Methods for processing fingerprint images, for instance to extract data that is useful in correlating an image with previously stored templates, are well known in the art. However, the prior art methods often rely upon the fingerprint image being of a known size and having a known area of interest, and are best suited for use with contact imaging devices that require the individual to hold their fingertip stationary during image acquisition. A particular problem with the swipe imagers described above is that it is unlikely that the individual will "swipe" their fingertip along a perfectly straight line. Accordingly, swipe imagers often produce a fingerprint image of arbitrary shape and size. This results in a breakdown of the assumptions that are inherent in the prior art processing methods and therefore must be addressed. Typical systems address this issue by increasing the processing to process the entire image in case features are located anywhere therein. Unfortunately, this approach requires changing every biometric identification system for use with each imager.

It would be advantageous to provide an imager that is functional with a plurality of identification processes. It would be further advantageous to provide a method for identifying and/or recognizing individuals based upon a feature extracted from an image of a fingerprint, the image being of arbitrary shape and size.

OBJECT OF THE INVENTION

Thus, in an attempt to overcome these and other limitations of the prior art, it is an object of this invention to provide a contact imaging device that provides an image area about a feature of interest as an output image therefrom.

SUMMARY OF THE INVENTION

In accordance with the invention there is provided a method of imaging a biometric information source comprising the steps of: sensing a biometric information source to provide biometric image data; analyzing the biometric image data to determine a location of at least a repeatably identifiable feature of the sensed biometric information within the biometric image data; and providing an image of a known size less than the size of the biometric image data, the provided image sensed at contiguous locations of the biometric information source near the determined location of the at least a repeatably identifiable feature.

In accordance with another aspect of the invention there is provided a method of imaging a biological surface comprising the steps of: sensing a plurality of images of a same biological surface; aligning the sensed images one relative to another to form a composite image of the biological surface; analyzing at least one of the composite image and the plurality of images to determine a location of a repeatably identifiable feature; and, providing a known amount of image data at locations relative to the location of the repeatably identifiable feature as the composite image data.

In accordance with yet another aspect of the invention there is provided a swipe fingerprint scanner comprising: a sensor for sensing a plurality of images of a same biological surface; a memory in communication with the sensor, for retrievably storing each image of the plurality of images; a processor in communication with the sensor and with the memory, the processor programmed for aligning the sensed images one relative to another to form a composite image of the biological surface, for analyzing the composite image to determine at least a location of a repeatably identifiable feature and, for providing a known amount of image data at locations relative to the determined location of the repeatably identifiable feature as output image data; and a data input/output port in communication with the processor, for receiving the output image data therefrom, and for providing the output image data to a processor external to the swipe fingerprint scanner.

BRIEF DESCRIPTION OF THE DRAWINGS

Exemplary embodiments of the invention will now be described in conjunction with the following drawings, in which similar reference numbers designate similar items.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. It is to be completely understood that the term "cropping", as it is used in the specification and in the claims that follow, is intended to encompass both actually deleting image data at image locations outside of a selected image area, and virtually "deleting" image data at image locations outside of a selected image area by merely eliminating such data from a frame of consideration—by ignoring such data or other than transferring said data from an imaging device.

Figure 1:
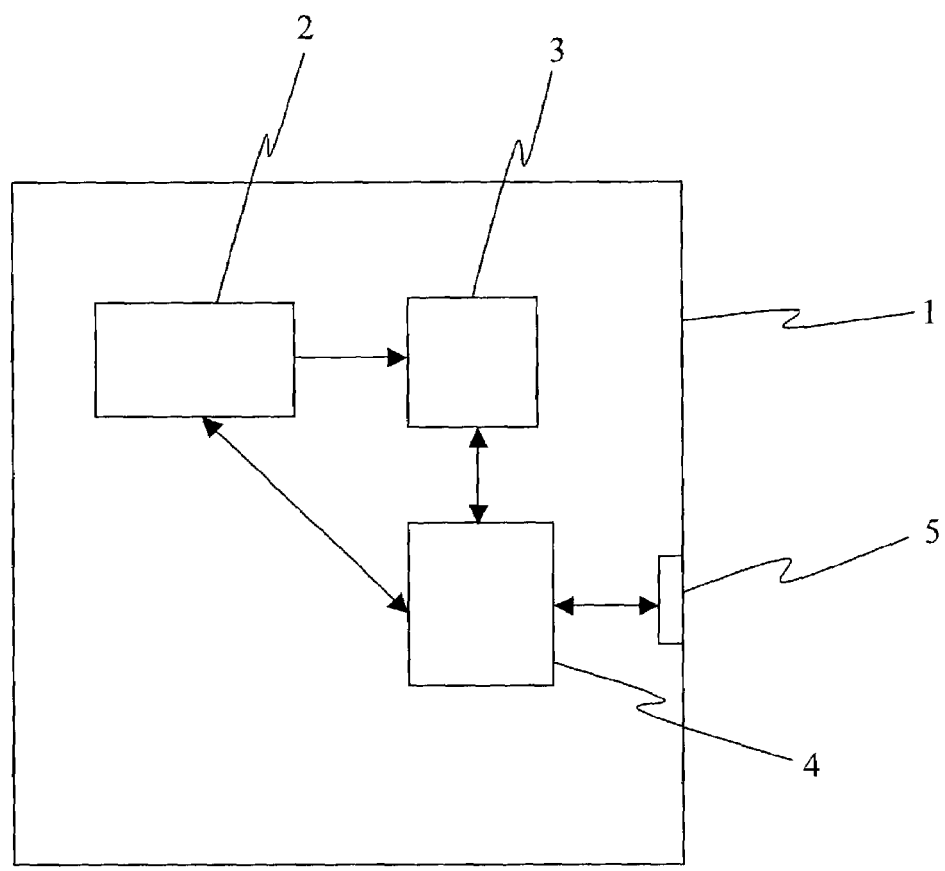
FIG. 1 is a simplified block diagram of a swipe scanner according to the instant invention.

Referring to FIG. 1, shown is a simplified block diagram of a swipe scanner according to the instant invention. The swipe scanner 1 comprises a swipe sensor 2 in communication with a memory buffer 3 and a processor 4. The processor 4 is in communication with the memory buffer 3 and with a data input/output port 5 for providing data to and for receiving data from a fingerprint correlation system (not illustrated). The swipe scanner 1 is of the swipe contact imager type, and is preferably a capacitive contact imaging sensor. Three examples of capacitive contact imaging sensors that are contemplated for use with the swipe scanner 1 are described below with reference to FIGS. 1a to 1c. In use, the swipe sensor 2 captures a plurality of overlapping image portions from a biometric information source, for example a fingerprint of a fingertip that has been placed into contact therewith. The image portions are provided to and retrievably stored within the memory buffer 3. Preferably, the memory buffer 3 is sufficiently large to store image data representative of an area larger than a typical fingerprint. The processor 4 is for retrieving the image portions from the memory buffer, one or more image portions at a time, and for constructing a single composite fingerprint image therefrom. To this end, the processor 4 is for executing program code thereon for processing, aligning and mosaicing the image portions. The processor 4 is also for locating a feature or features within the processed image portions, and for cropping image data outside of a selected area about the located feature or features, to produce an output image of known size and shape. Optionally, the processor 4 is for locating a feature or features within the composite fingerprint image, and for cropping image data outside of a selected area about the located feature or features, to produce an output image of known size and shape. In use, the processor 4 provides the output image of known size and shape to a fingerprint correlation system via the data input/output port 5. Optionally, the data input/output port 5 is also for receiving preferences from the fingerprint correlation system, such as for instance a desired size of the output image.

Figure 1A:
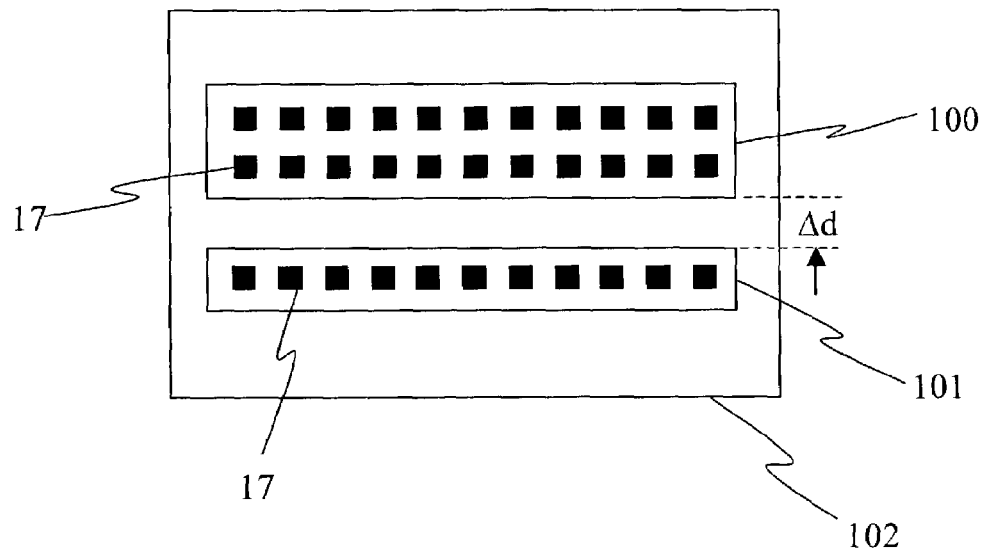
FIG. 1a is a simplified block diagram of a first swipe sensor contemplated for use with the swipe scanner of FIG. 1.

Referring to FIG. 1a, shown is a first swipe sensor contemplated for use with the swipe scanner of FIG. 1. The first swipe sensor includes a single active matrix addressed first sensing pad 100 having an X-Y array of sense elements including r rows (1 to r) with c sensing elements 17 in each row. In practice there are about 10 rows and 300 columns of regularly-spaced elements occupying an area of approximately 0.1 cm×2 cm. Sensing elements 17 are sized and disposed in such a fashion that they are capable of distinguishing the smallest desired feature of a fingerprint. The placement and spacing of the sensor elements preferably is such that an image of a fingerprint, once scanned, contains sufficient features for analysis. Most preferably, in order to generate an image for analysis, a sensing element 17 is smaller than half the smallest feature size to be sensed.

Adjacent the first sensing pad 100 is a second sensing pad 101 for use in determining motion of a sensed fingertip. Because of the random nature of fingerprint data, a scan line across a fingertip is unlikely to match a second other scan line across the same fingertip unless both scan lines are of a same portion of the fingertip. Therefore, when the sensed fingerprint data sensed by the second sensing pad 101 is substantially the same as data previously sensed by the first sensing pad 100, the fingertip is known to have moved a predetermined distance Δd. Thus, currently sensed fingerprint data, sensed by the first array has a known relative position to the previously sensed data. The second sensing pad 101 does not need to be as topographically sensitive as the first sensing pad 100. In this regard, the second sensing pad 101 may have a lower resolution than the first sensing pad 100, thereby reducing component costs.

The combined sensing and measuring array of FIG. 1a is disposed within a platen 102 for accepting a fingertip. Preferably, the platen 102 has an area of approximately 2 cm×4 cm for accepting a fingertip drawn across the sensing elements 17.

Figure 1B:
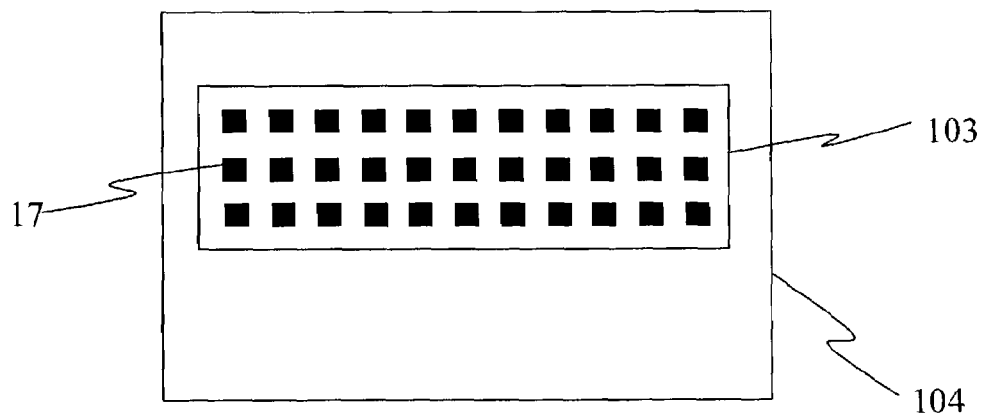
FIG. 1b is a simplified block diagram of a second swipe sensor contemplated use with the swipe scanner of FIG. 1.

Referring now to FIG. 1b, shown is a second swipe sensor contemplated for use with the swipe scanner of FIG. 1. The second swipe sensor includes a single, or unified, active matrix addressed sensing pad 103 having an X-Y array of sense elements including r rows (1 to t) with d sensing elements 17 in each row. In practice there may be about 10 rows and 300 columns of regularly spaced elements occupying an area of approximately 0.15 cm×2 cm. Sensing elements 17 are sized and disposed in such a fashion that they are capable of distinguishing the smallest desired feature of a fingerprint. The placement and spacing of the sensor elements allow an image of a fingerprint, once scanned, to contain sufficient features for analysis. Preferably, in order to generate an image for analysis, a sensing element 17 is smaller than half the smallest feature size to be sensed.

In contrast to FIG. 1a, in the swipe sensor of FIG. 1b the array for determining motion of a sensed fingertip and the sensing array are a same array. The single active matrix addressed sensing pad 103 permits, by virtue of having a series of arrays, both concurrent receipt of fingerprint data and comparison with previously stored data of the fingertip as a fingertip is passed over the sensing pad 103. The swipe sensor illustrated in FIG. 1b functions in a similar manner to the swipe sensor illustrated in FIG. 1a.

The unitary swipe sensor of FIG. 1b is disposed within a platen 104 for accepting a fingertip. Preferably, the platen has an area of approximately 2 cm×4 cm for accepting a fingertip that is drawn across the sensing elements 17.

Figure 1C:
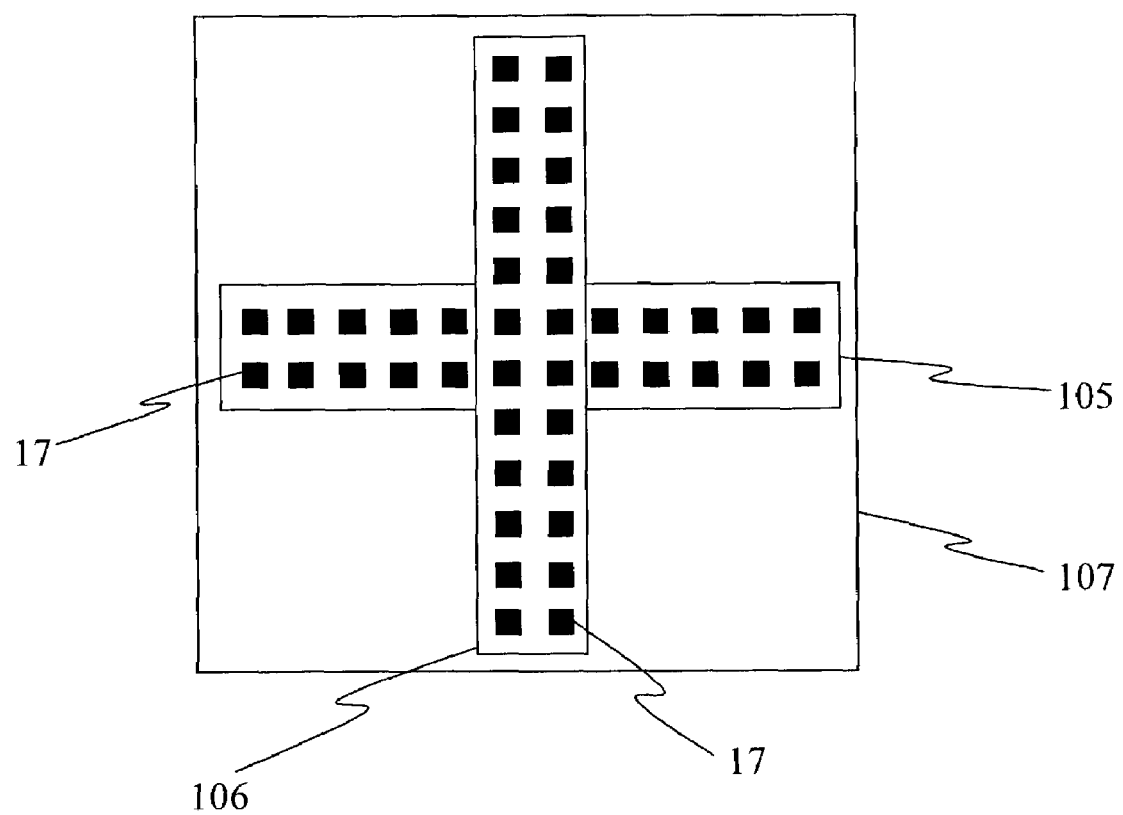
FIG. 1c is a simplified block diagram of a third swipe sensor contemplated for use with the swipe scanner of FIG. 1.

Referring now to FIG. 1c, shown is a third swipe sensor contemplated for use with the swipe scanner of FIG. 1. The third swipe sensor is a multi-directional swipe sensor including a horizontal active matrix addressed sensing pad 105 having an X-Y array of sense elements including r rows (1 to u) with e sensing elements 17 in each row, and a vertical active matrix addressed sensing pad 106 having an X-Y array of sense elements including t rows (1 to v) with f sensing elements 17 in each row. In practice, either sensing pad 105, 106 includes approximately 10 rows and 300 columns of regularly spaced elements occupying an area of approximately 0.15 cm×2 cm. Sensing elements 17 are sized and disposed in such a fashion that they are capable of distinguishing the smallest desired feature of a fingerprint. The placement and spacing of the sensor elements allow an image of a fingerprint, once scanned, to contain sufficient features for analysis. Preferably, in order to generate an image for analysis, a sensing element 17 is smaller than half the smallest feature size to be sensed.

The multi-directional swipe sensor of FIG. 1c is disposed within a platen 107 for accepting a fingertip. Preferably, the platen 107 has an area of approximately 4 cm×4 cm for accepting a fingertip that is drawn across the sensing elements 17. Advantageously, the multi-directional swipe sensor supports fingerprint image construction when the individual draws their fingertip across the sensing elements 17 in any direction. Unfortunately, the constructed image is of arbitrary shape and size if the individual fails to draw their fingertip along a perfectly straight line.

Figure 2:
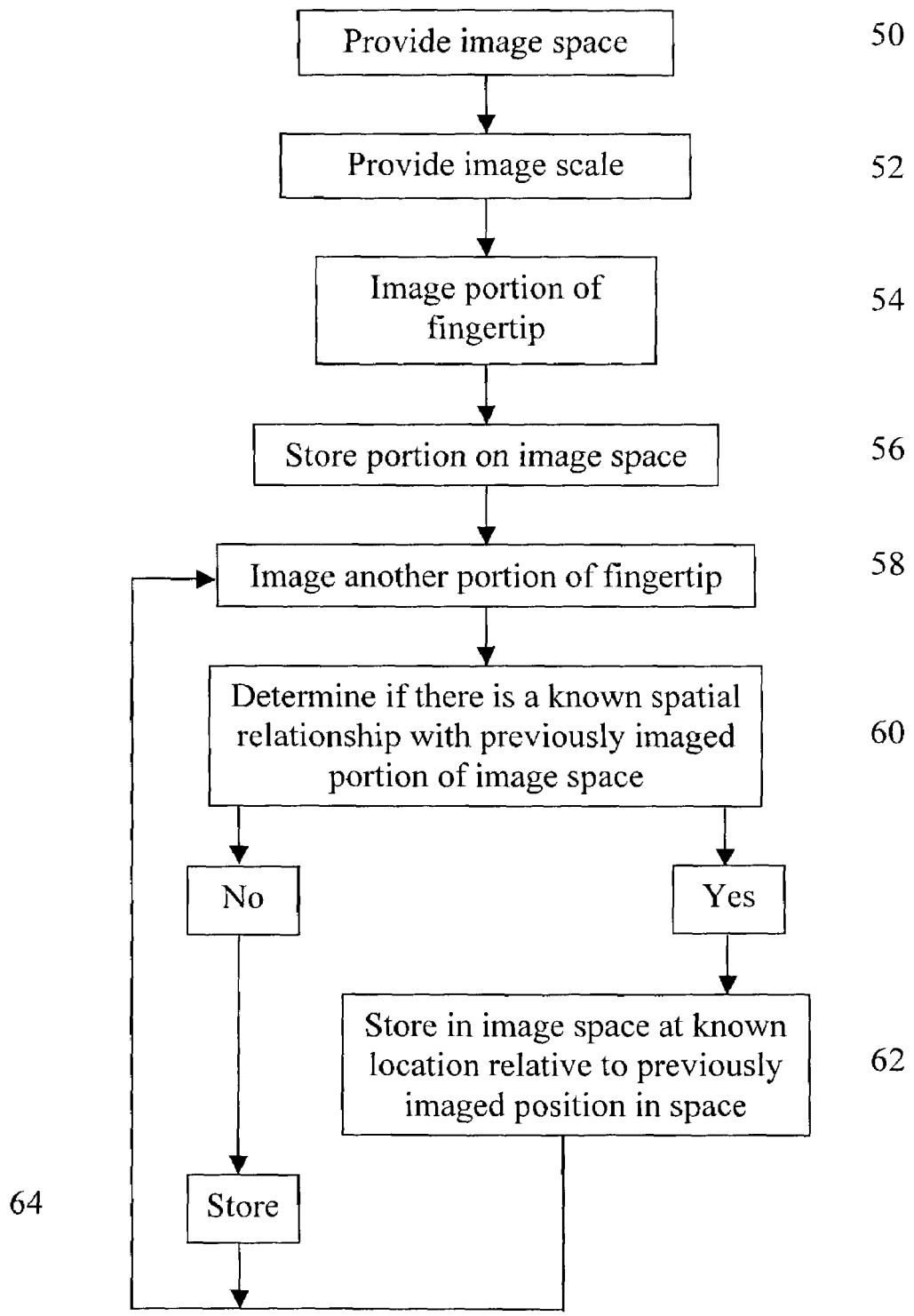
FIG. 2 is a simplified flow diagram of a method for processing fingerprint information received from one of the swipe sensors shown in FIG. 1a to 1c to construct a composite image of the fingerprint.

Referring now to FIG. 2, shown is a simplified flow diagram of a method for processing fingerprint information received from a swipe fingerprint scanner to construct a composite image of the fingerprint. In a first step an image space 50 is provided followed by an image scale 52. An initial image portion of the fingertip is provided 54 and stored 56 within the image space 50. Another portion of a fingertip is then imaged 58.

In a next step a search for a correlation between the initial image and a second other image is initiated, that is, it is determined 60 if there is a known spatial relationship between stored images. There are two possible results to the search: YES or NO.

In the case of a YES response an image is stored 62 in the image space at a known location relative to a previously imaged portion and another portion of a fingertip is then imaged 58. Again it is determined if there is a known spatial relationship between stored images 60. In the case of a NO response the image portion is stored 64 for later reference and another portion of the fingertip is then imaged 58 and it is determined 60 if there is a known spatial relationship between stored images. By the use of a suitably programmed processor, thresholds for rejection or acceptance of data in determinations of correlation are selectable. After sufficient correlations are found, the data is then assembled using known relations between different image portions and a composite fingerprint image so formed is compared to a stored template of fingerprint data. For example, the fingerprint assembly is performed using a simultaneous solution to place all image portions having unknown fixed locations but limited possible locations relative to some other image portions. Alternatively, the composite image is assembled through iterative steps of image portion placement and image analysis to determine placement errors.

As described above, the composite image produced according to the method of FIG. 2 is of arbitrary size and shape. Significantly, features that are of interest for use with correlation methods may be located anywhere within the image. Unfortunately, processing such an arbitrarily large image in its entirety to extract features for comparison to template data increases unnecessarily the amount of processing that is required to identify/recognize an individual. Further, it complicates image processing algorithms that usually require images of known size and resolution.

Figure 3:
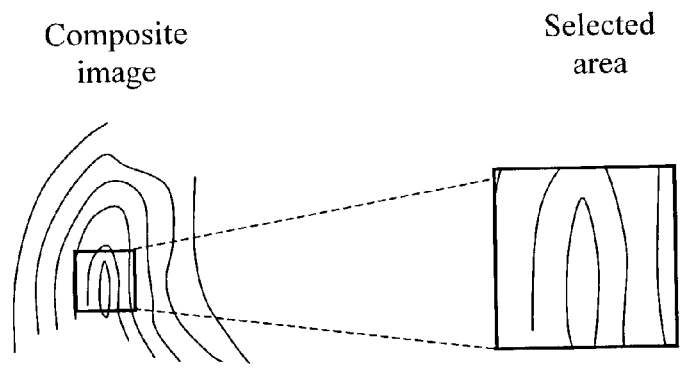
FIG. 3 is a schematic diagram showing a composite fingerprint image obtained using the swipe scanner of FIG. 1, including a selected area proximate the fingerprint core.

Referring now to FIG. 3, shown is a simplified diagram of a composite fingerprint image that was obtained using a swipe fingerprint scanner, including a selected area proximate a feature or features of interest, for example the fingerprint core. In FIG. 3, the selected area is delineated by a square border, which has been superimposed upon the composite fingerprint image. Preferably, the size of the selected area is defined in terms of a number of columns of pixels to either side of the feature of interest and a number of rows of pixels above and below the feature of interest. For example, a user specifies the size of the selected area by providing a desired number of columns and a desired number of rows of pixels to display within the selected area. Optionally, the size of the selected area is a same predetermined value for every correlation application and every swipe scanner system.

FIG. 3 also shows an enlarged view of the selected area in which extraneous fingerprint data has been cropped, for example any data that lies outside of the square region. According to a first embodiment of the instant invention, the swipe scanner provides an output image comprising image data for image portions falling within the selected area, for use by a correlation processor for comparison to template data. Advantageously, the portion of the fingerprint image that lies within the selected area is of known size and shape and contains the features that are required for correlation, such that the output image has universal utility. Optionally, the selected area is defined relative to a feature other than the core, such as for instance a crease or a minutia.

Figure 5:
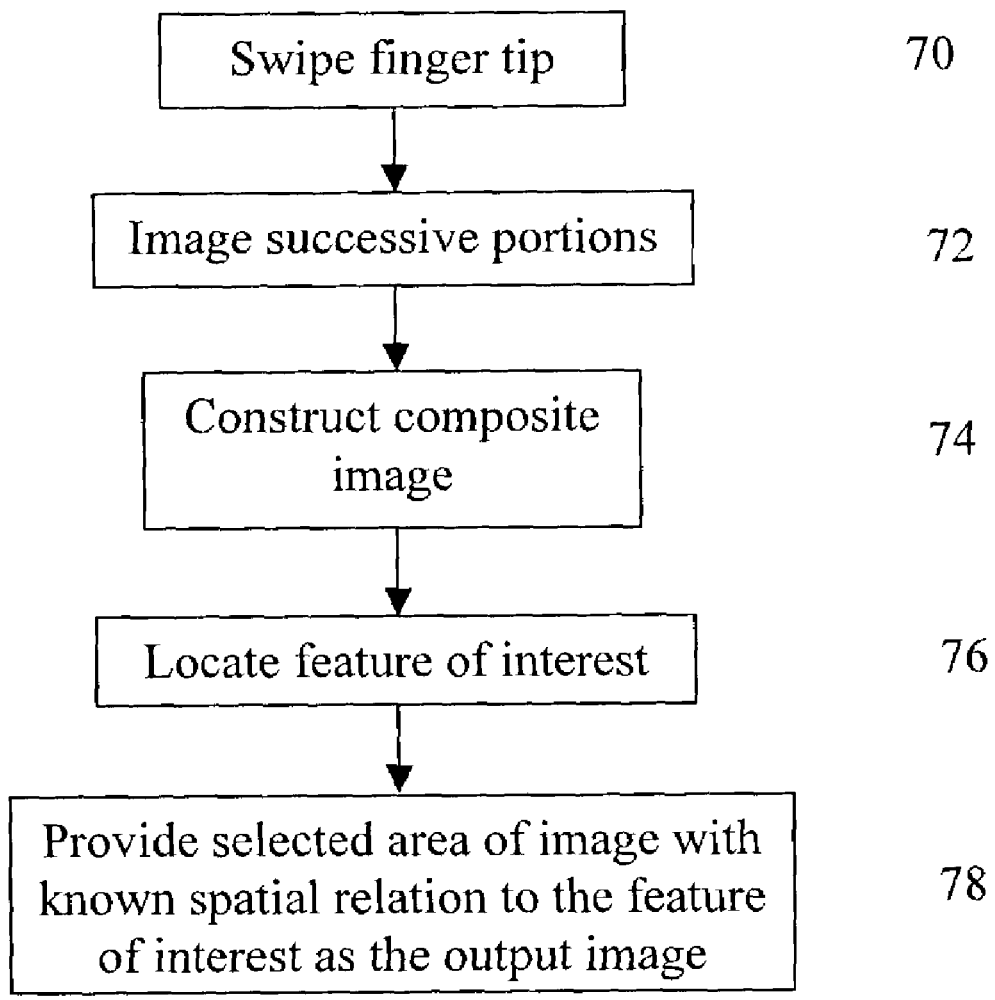
FIG. 5 is a simplified flow diagram of a method according to a first embodiment of the instant invention, for imaging a fingerprint using the swipe fingerprint scanner of FIG. 1 and for provision of an image derived therefrom and about a feature or features of interest.

Referring to FIG. 5, shown is a simplified flow diagram of a method according to a first embodiment of the instant invention, for imaging a fingerprint using a swipe fingerprint scanner and for provision of an image derived therefrom, the image about a feature or features of interest. A fingertip is passed over the swipe fingerprint imager 70 and is imaged in separate overlapping portions 72. A memory buffer within the scanner maintains the imaged portions and a processor acts to construct 74 a composite image of the fingertip from numerous scanned portions. The composite image is not limited to a fixed area of the fingertip and as such, the buffer is sufficient in size to maintain a larger than normal fingerprint image.

Once the composite image is constructed 74, the processor analyses the constructed image to locate 76 a feature or features of interest. Typically, for fingerprint images, the feature of interest is the fingerprint core. Methods for identifying the core are known, such as for instance the method described below with reference to FIG. 8. A selected area is then defined about the feature of interest to define a fingerprint image having a resolution according to design requirements, and the selected area is provided 78 as the output image from the swipe fingerprint scanner.

Figure 6A:
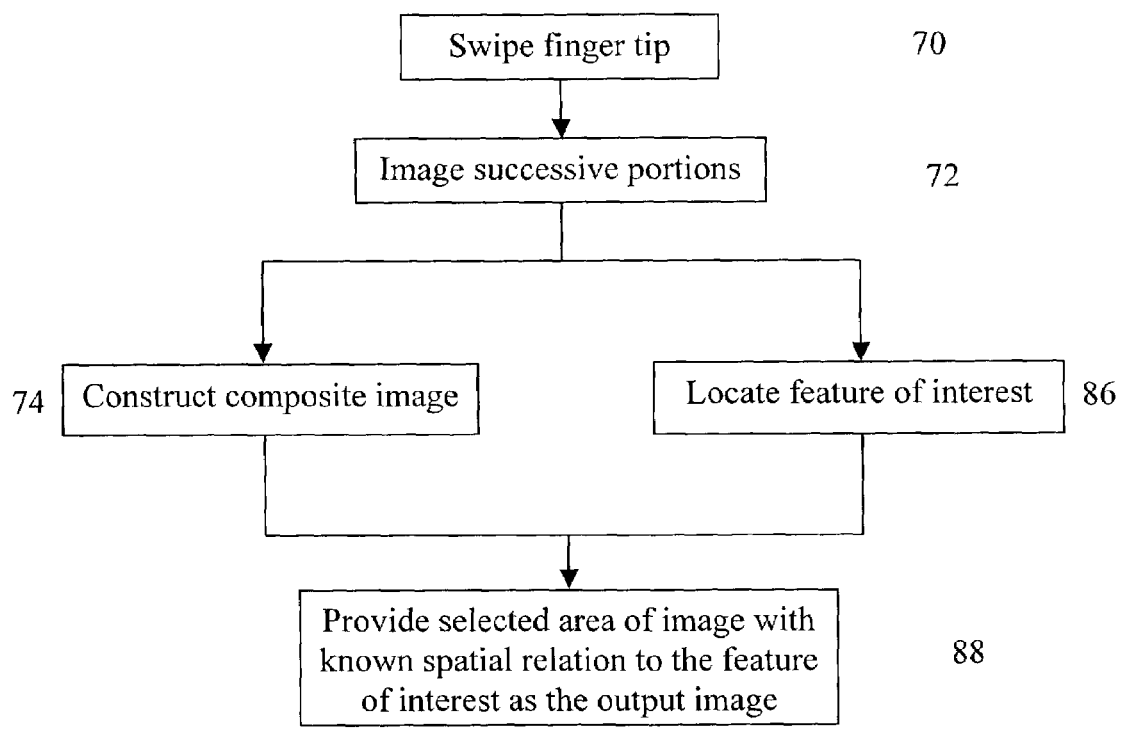
FIG. 6a is a simplified flow diagram of another method according to the first embodiment of the instant invention, for imaging a fingerprint using the swipe fingerprint scanner of FIG. 1 and for provision of an image derived therefrom and about a feature or features of interest.

Referring now to FIG. 6a, shown is a simplified flow diagram of another method according to the first embodiment of the instant invention, for imaging a fingerprint using the swipe fingerprint scanner of FIG. 1 and for provision of an image derived therefrom about a feature or features of interest. A fingertip is passed over the swipe fingerprint imager 70 and is imaged in separate overlapping portions 72. A memory buffer within the scanner maintains the imaged portions and a processor acts to construct 74 a composite image of the fingertip from numerous scanned portions. According to the method of FIG. 6a, the processor begins analyzing fingerprint image data immediately in order to locate 86 a feature or features of interest, this reduces the overall buffer size requirements and reduces the processing overhead for image construction in many situations. Typically, for fingerprint images, the feature of interest is the fingerprint core. Methods for identifying the core are known, such as for instance the method described below with reference to FIG. 8. That said, core identification is a difficult task and it is preferred that core identification commence only after sufficient image construction has occurred, in order to make accurate core identification reasonably possible. According to the method of FIG. 6a, the steps of image construction 74 and of image analysis to locate 86 the feature of interest are performed substantially in parallel.

Once the composite image is constructed and the feature of interest is located, a selected area of the composite image having a known spatial relation to the feature of interest is defined, the image within the buffer is cropped—extraneous data is ignored or deleted—and the selected area of the composite image is provided 88 as the output image.

Figure 6B:
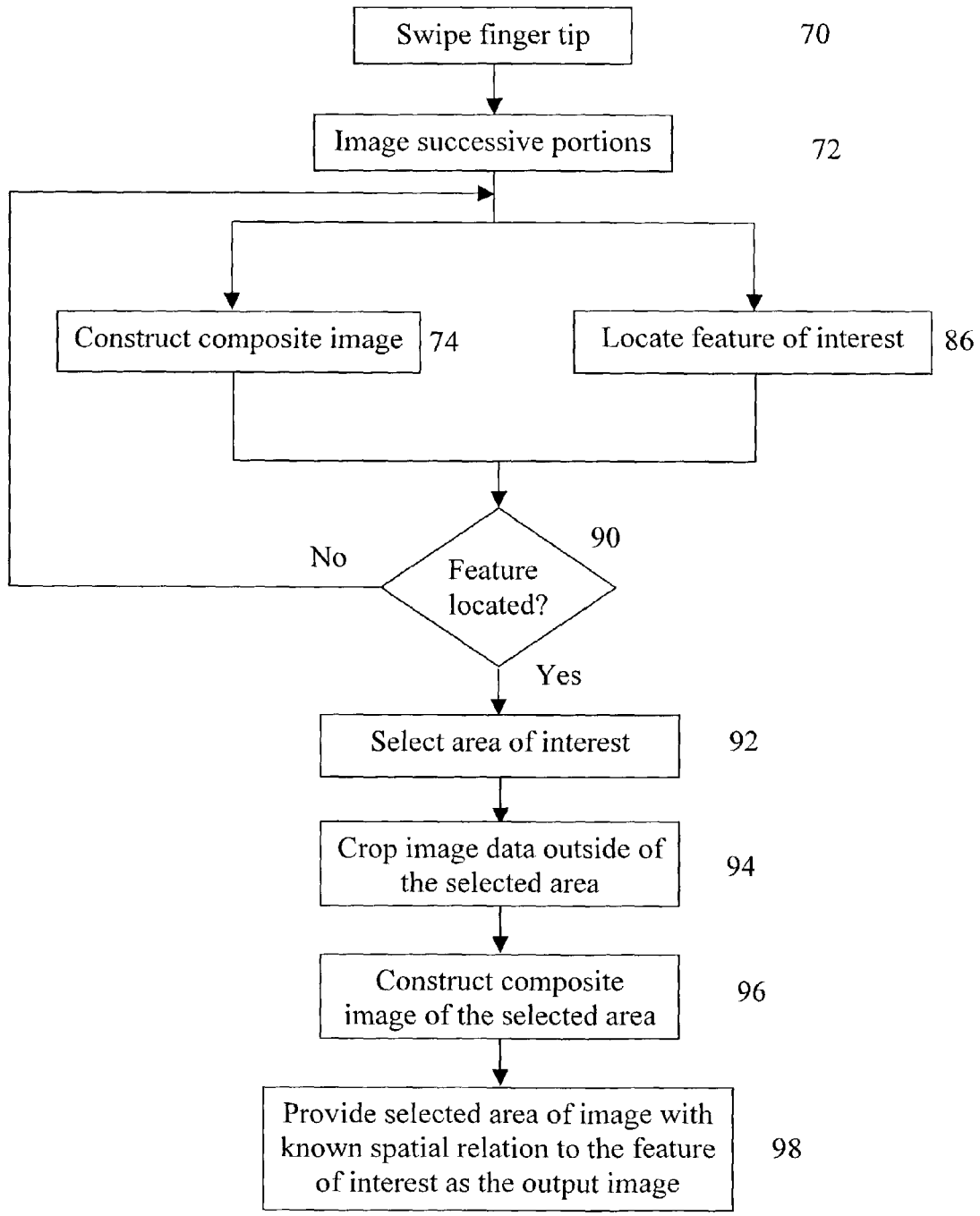
FIG. 6b is a simplified flow diagram of still another method according to the first embodiment of the instant invention, for imaging a fingerprint using the swipe fingerprint scanner of FIG. 1 and for provision of an image derived therefrom and about a feature or features of interest.

Referring now to FIG. 6b, shown is a simplified flow diagram of still another method according to the first embodiment of the instant invention, for imaging a fingerprint using the swipe fingerprint scanner of FIG. 1 and for provision of an image derived therefrom and about a feature or features of interest. A fingertip is passed over the swipe fingerprint imager 70 and is imaged in separate overlapping portions 72. A memory buffer within the scanner maintains the imaged portions and a processor acts to construct 74 an image of the fingertip from numerous scanned portions. According to the method of FIG. 6a, the processor begins analyzing fingerprint image data immediately in order to locate 86 a feature or features of interest, this reduces the overall buffer size requirements and reduces the processing overhead for image construction in many situations. Typically, for fingerprint images, the feature of interest is the fingerprint core. Methods for identifying the core are known, such as for instance the method described below with reference to FIG. 8. That said, core identification is a difficult task and it is preferred that core identification commence only after sufficient image construction has occurred to make accurate core identification reasonably possible.

According to the method of FIG. 6b, the steps of image construction 74 and of image analysis to locate 86 the feature of interest are performed substantially in parallel until it is determined at 90 that the feature of interest has been located. A selected area of the partially constructed composite image having a known spatial relation to the feature of interest is defined 92. The image within the buffer is cropped—extraneous data is ignored or deleted—and the image construction continues 96 only within the selected area. The selected area of the composite image is provided 98 as the output image.

Figure 6C:
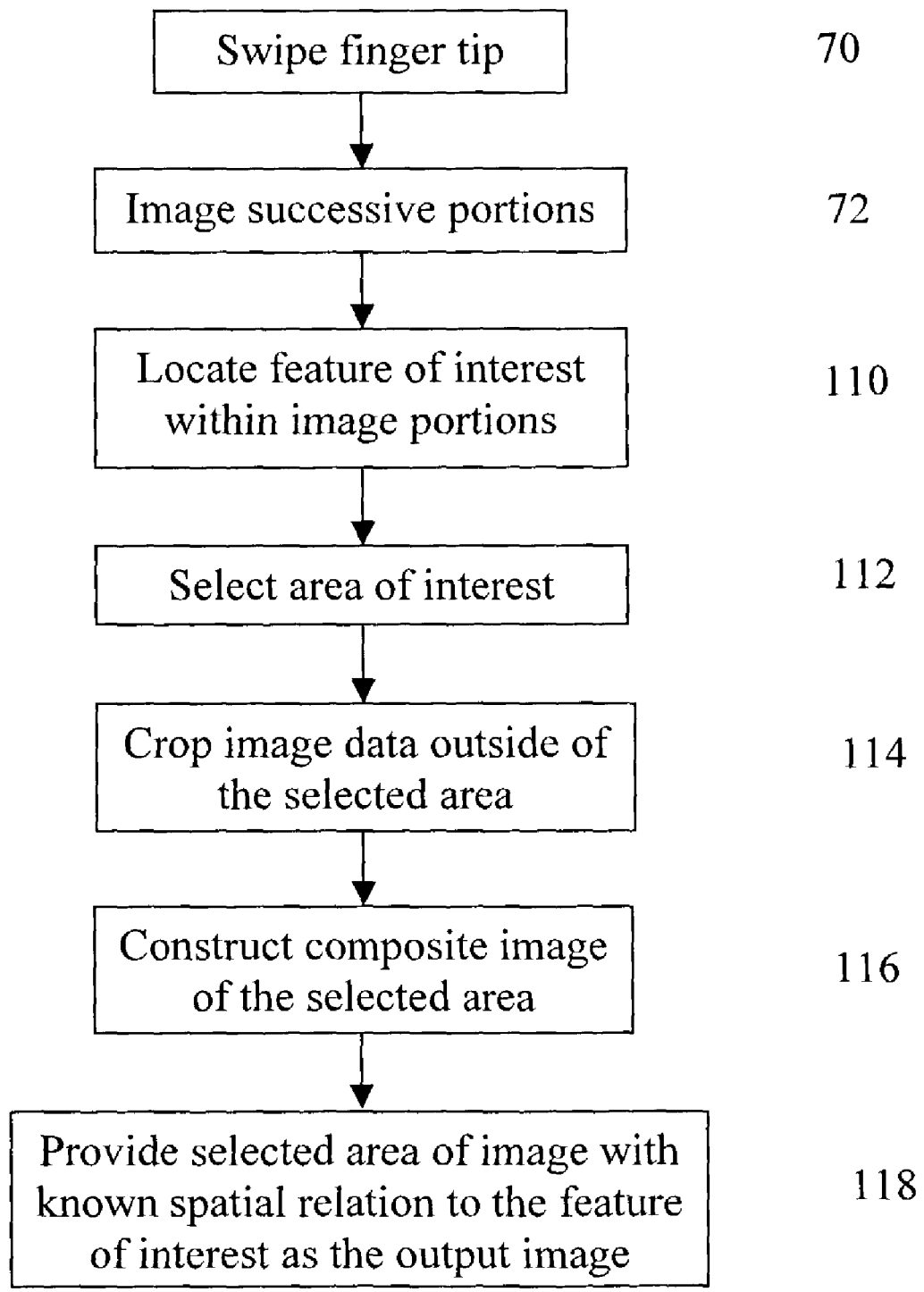
FIG. 6c is a simplified flow diagram of yet another method according to the first embodiment of the instant invention, for imaging a fingerprint using the swipe fingerprint scanner of FIG. 1 and for provision of an image derived therefrom and about a feature or features of interest.

Referring now to FIG. 6c, shown is a simplified flow diagram of yet another method according to the first embodiment of the instant invention, for imaging a fingerprint using the swipe fingerprint scanner of FIG. 1 and for provision of an image derived therefrom and about a feature or features of interest. A fingertip is passed over the swipe fingerprint imager 70 and is imaged in separate overlapping portions 72. A memory buffer within the scanner maintains the imaged portions and a processor acts to locate 110 a feature or features of interest within the imaged portions. Preferably, the feature or features of interest are common to all or nearly all imaged portions. Typically, for fingerprint images, the feature of interest is the fingerprint core. Methods for identifying the core are known, such as for instance the method described below with reference to FIG. 8. Once the feature of interest has been located, a selected area having a known spatial relation to the feature of interest is defined 112. The image within the buffer is cropped 114—extraneous data is ignored or deleted—and image construction is performed 116 only for the selected area. The selected area of the composite image is provided 118 as the output image.

Figure 7:
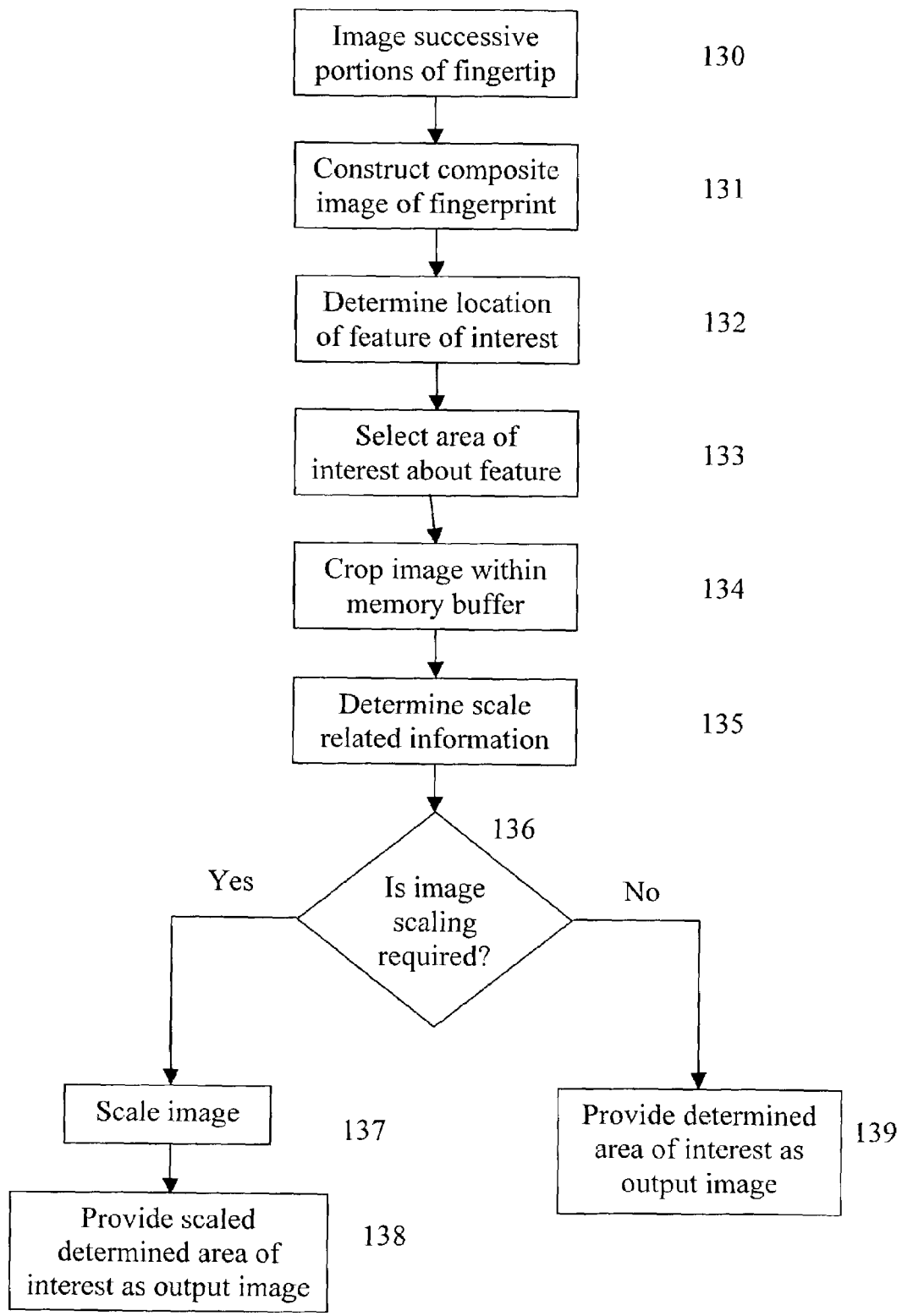
FIG. 7 is a simplified flow diagram of a method according to the instant invention for imaging a fingerprint using the swipe fingerprint scanner of FIG. 1 and for provision of a scaled image derived therefrom and about a feature or features of interest.

Referring to FIG. 7, shown is a simplified flow diagram of a method according to the instant invention for imaging a fingerprint using the swipe fingerprint scanner of FIG. 1 and for provision of a scaled image derived therefrom and about a feature or features of interest. An individual swipes their fingertip and the swipe fingerprint scanner captures 130 a plurality of successive images of portions of the fingerprint. The images are then constructed 131 into a composite fingerprint image. The composite fingerprint image is then analysed to determine 132 a location of a known feature. Once the feature of interest has been located, a selected area having a known spatial relation to the feature of interest is defined 133. The image within the buffer is cropped 134— extraneous data outside the area of interest is ignored or deleted. Further, the image is analyzed 135 to determine scale related information. The scale related information is then used to determine whether the area of interest is to be larger or smaller or in most applications whether the area of interest should be scaled through application of an image transform to decrease ridge spacing or to increase ridge spacing. If it is determined at step 136 that image scaling is required, then the image is scaled 137, and the scaled determined area of interest is provided as the output image 138. If it is determined at step 136 that image scaling is not required, then the selected area of interest is provided directly as the output image at step 139.

Figure 8:
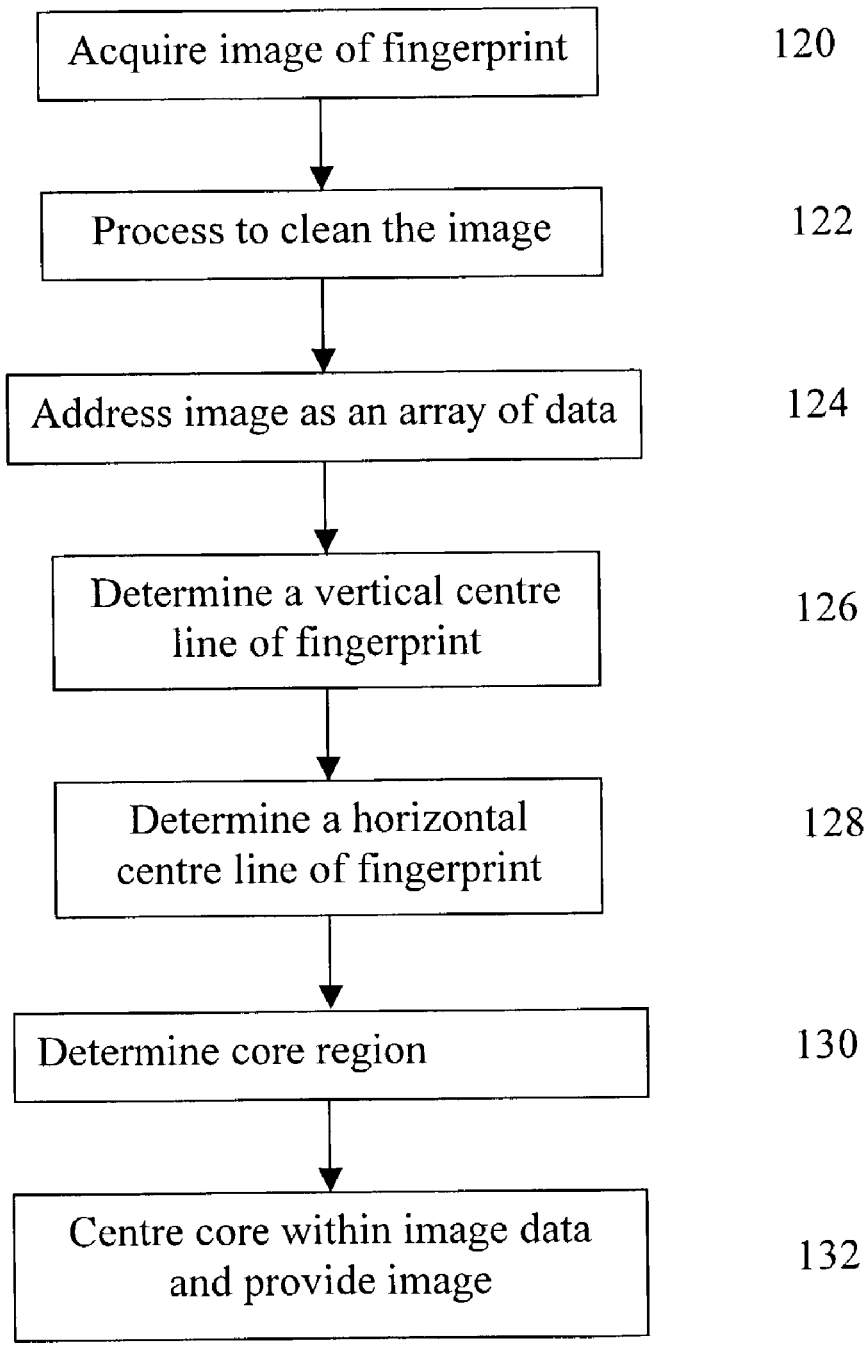
FIG. 8 is a simplified flow diagram of a method for locating the core region of an acquired fingerprint image.
Figure 9:
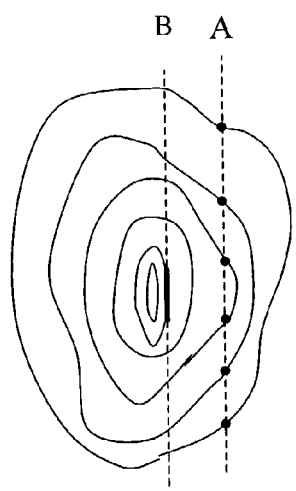
FIG. 9 is a simplified diagram showing ridge-trough alternation near the periphery of a fingerprint image.

Referring now to FIG. 8, a method of core identification for fingerprint analysis is shown. At step 120 an image of a fingerprint is acquired, optionally the fingerprint image is obtained as one of a single image and a composite image constructed from a plurality of image portions. The acquired image is processed at step 122 to clean up the image in order to enhance contrast between ridges and valleys. For instance, ridges are cleaned up to remove artifacts that may relate to imaging errors caused by, for example, moisture, dryness, or scars. The cleaned up image is then addressed as an array of data at step 124. The array of data is analyzed to determine 126 a center line of the fingertip, for instance along a vertical path ridges are followed to determine a vertical center line of the fingertip. As will be noted with reference to FIG. 9, a ridge value alternation exists near the periphery of the fingerprint, shown schematically as a series of dots located along vertical line A. As the center is approached, a vertical line remains on one of a ridge or a valley for a longer time, as denoted by the widened portion of line B. When a ridge can no longer be followed along a vertical path, for instance a valley is encountered, then the above step is repeated for a ridge along a horizontal path. The procedure is repeated along vertical and horizontal paths 128 in an iterative fashion, until the core is identified 130. When desired, the process can be repeated at angles such as 45 degree angles within the array. The method described with reference to FIG. 8 is suitable for identifying a core of a fingerprint that is classified as a whorl; additionally, methods are known in the art for identifying the core regions of fingerprints belonging to other groups. Optionally, the core is positioned 132 centrally within the image data before the output image is provided. Further optionally, the core is positioned at a user specified location within the image data.

The composite image provided as the output image is optionally the cleaned up image. Further optionally, it is the raw image merely cropped to identify a region of interest.

According to the first embodiment of the instant invention, the feature of interest, for instance the core, is centered within the selected area of image data for provision from the sensor. The image data is of a size and resolution relating to the sensor itself. Typical sensors provide 300×200 pixels having 50 µm spacing. Thus, the core is centered at location (150, 100) within the provided image. Of course, the position of the feature of interest will vary depending upon the selected feature and upon the sensor.

Figure 4:
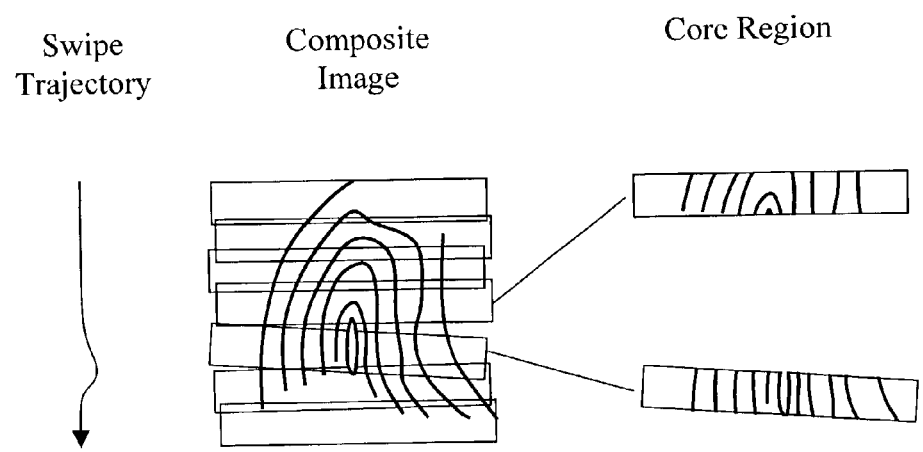
FIG. 4 is a schematic diagram showing misalignment of individual images of a composite fingerprint image proximate the fingerprint core.

According to a second embodiment of the instant invention there is provided a method wherein the quality of the image of the selected area is evaluated prior to the image being output from the sensor. Referring to FIG. 4, shown is a schematic diagram illustrating misalignment of image portions of a composite image proximate the core of the fingerprint. The misalignment is caused by, for example, the individual drawing their fingertip across the sweep imager along an erratic swipe trajectory such as the one illustrated to the left of the composite image, such that successive image portions do not line up straight with every other image portion. As shown in FIG. 4, portions of the image in an area of interest, for instance an area about the core, may be unpopulated with image data.

Figure 11:
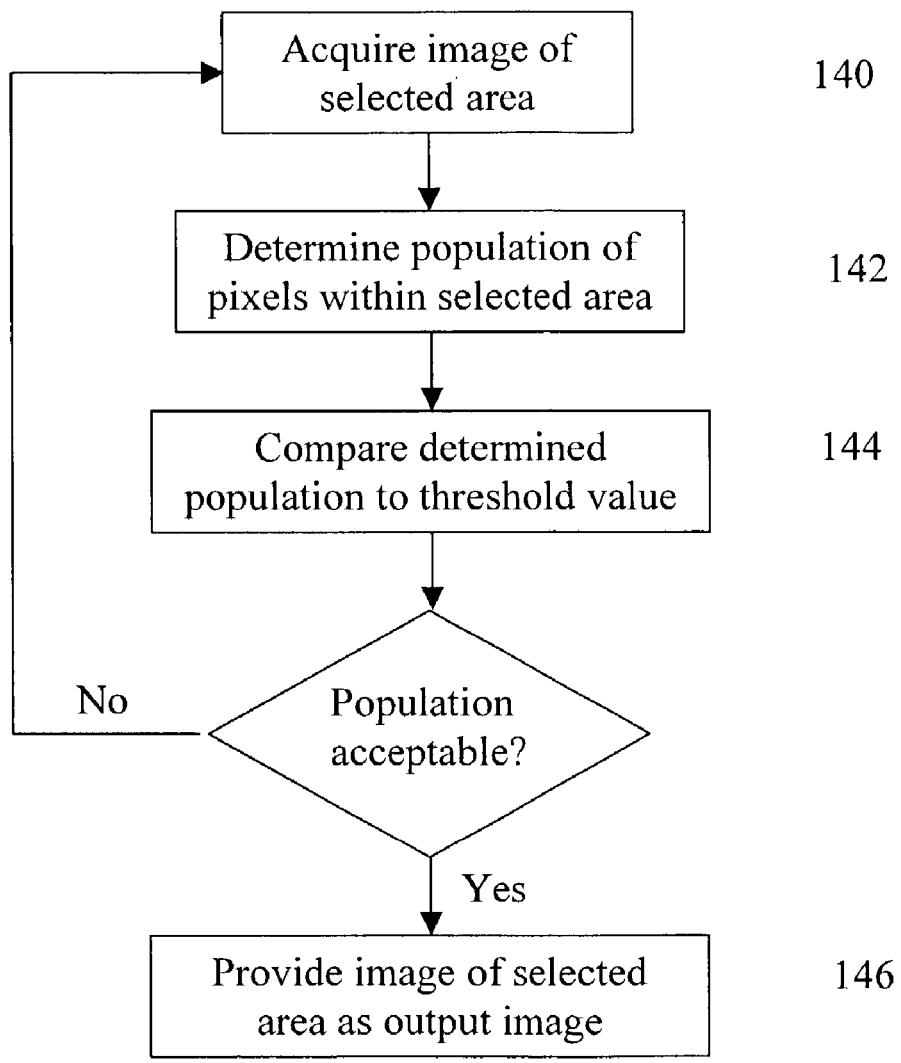
FIG. 11 shows a method according to a second embodiment of the instant invention for imaging a fingerprint using a swipe fingerprint scanner of FIG. 1 and for provision of an image derived therefrom and about a feature or features of interest.

Referring now to FIG. 11, shown is a method according to the second embodiment of the instant invention for imaging a fingerprint using a swipe fingerprint scanner and for provision of an image derived therefrom and about a feature or features of interest. An image of a selected area of a fingerprint is acquired 140, for instance according to a method described with reference to one of FIGS. 5, 6a, 6b, 6c and 7. The population of pixels within the selected area is determined at step 142, for instance pixels representative of image data are counted as populated, while pixels that are not representative of image data are counted as being unpopulated. Optionally, the population is defined in absolute terms or as a fraction of the total number of pixels. The population so defined is compared at step 144 to a threshold value for accepting the image as a quality image. For instance, the comparison requires that the determined pixel population exceeds a threshold value of 99%. Of course, the actual threshold value depends upon the level of security that is desired, etc. If it is determined that the population is within the threshold value, then the image is provided as the output image at step 146. If it is determined that the population is outside the threshold value, then the image is considered to be of poor quality, a new image is acquired and the method of FIG. 11 is repeated.

Figure 10:
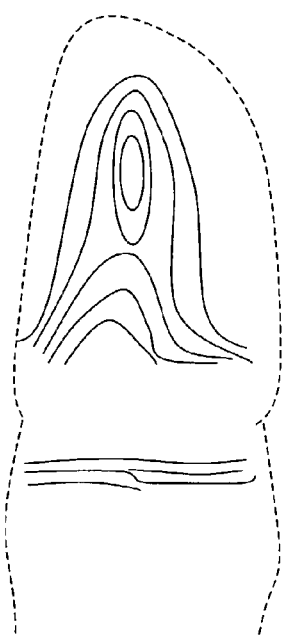
FIG. 10 is a simplified diagram showing a first crease feature of a fingerprint image.

Of course, features of interest selected from other feature types are also suitable for use with any of the above-described methods. For instance, the selected area is optionally defined as an area about and including a minimum number of minutia points per unit area of image. Further optionally, a crease as is shown in FIG. 10 is used as the feature of interest, more particularly it is the crease nearest the tip in a finger. The crease is identified within a fingerprint image and data above the crease—toward the fingertip—is provided from the sensor. Alternatively, data from the centre of the region above the crease is provided from the sensor. Still further optionally, a delta is used as the feature of interest. A delta is a divergence point where the fingerprint ridges tend to wrap around the center of the finger. A whorl-type fingerprint usually has two deltas, a right loop fingerprint has a delta on the left of the observer, and a left loop fingerprint has a delta on the right of the observer. Of course, any other identifiable feature type is also envisaged for use with the described with reference to FIGS. 5, 6a, 6b, 6c, and 7. The above-mentioned feature types are provided merely for illustrative purposes, and should be interpreted only as non-limiting examples.

Figure 12:
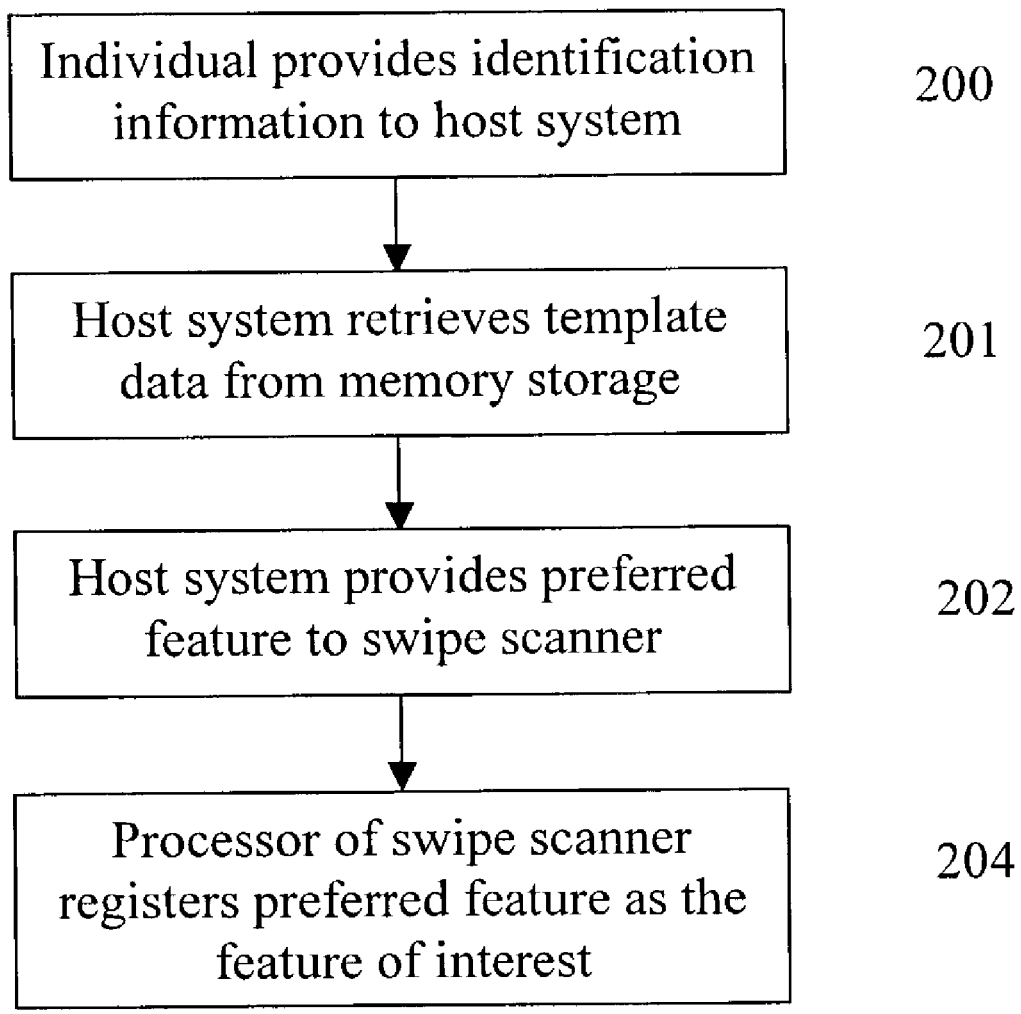
FIG. 12 is a simplified flow diagram of a method according to a third embodiment of the instant invention for imaging a fingerprint using a contact imaging device and for provision of an image derived therefrom and about a feature or features of interest.

Referring now to FIG. 12, shown is a method for selecting a feature type of the feature of interest for use in identifying/recognizing an individual. At step 200, the individual being identified/recognized provides identification information to a host system that is in communication with the swipe fingerprint scanner. At step 201 a processor of the host system retrieves, from a memory storage area, template data relating to the identification information and including data indicative of a preferred feature for use in identifying the individual. For example, if the individual does not have a repeatably identifiable fingerprint core, then the preferred feature may be a densely packed group of minutiae points. At step 202 the host processor provides the data indicative of the preferred feature to the processor of the swipe fingerprint scanner, and at step 204 the processor of the swipe fingerprint scanner registers the preferred feature as the feature of interest. The steps of FIG. 12 are optionally performed prior to the first step of any of the methods described above with reference to FIGS. 5, 6a, 6b, 6c and 7.

Figure 13:
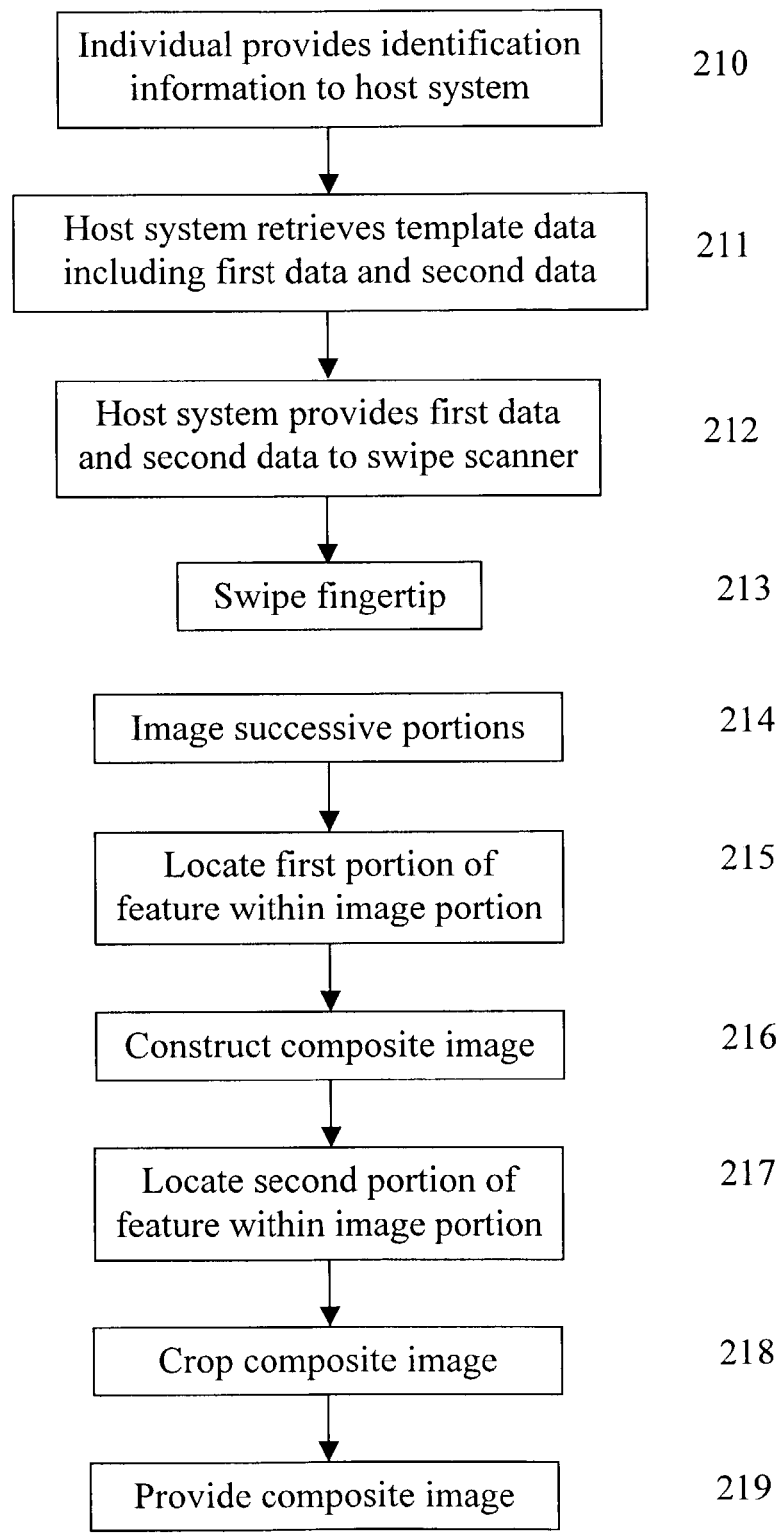
FIG. 13 is a simplified flow diagram of a method according to a fourth embodiment of the instant invention for imaging a fingerprint using a contact imaging device and for provision of an image derived therefrom and about a feature or features of interest; and, FIG. 14 is a simplified flow diagram of a method according to the instant invention for imaging a fingerprint using a contact imaging device and for provision of an image derived therefrom and about a feature or features of interest.

Further optionally, if first and second portions of an individual's preferred feature can be imaged within first and second image portions, respectively, for instance using 10 rows and 300 columns of sensing elements, then it is possible to significantly reduce the amount of processing that is required to perform composite image construction. Referring now to FIG. 13, at step 210 the individual being identified/recognized provides identification information to a host system that is in communication with the swipe fingerprint scanner. A processor of the host system retrieves at step 211, from a memory storage area, template data relating to the identification information and including first data indicative of the first portion of the preferred feature and second data indicative of the second portion of the preferred feature. At step 212 the host system provides the first data and the second data to the processor of the swipe fingerprint scanner. The individual passes a fingertip over the swipe fingerprint imager 213 and the fingertip is imaged in separate overlapping portions 214. A memory buffer within the scanner maintains the image portions and a processor acts to locate 215 the first portion of the preferred feature within a single image portion. Once the first portion of the feature of interest has been located, construction of the composite image occurs at step 216. For instance, the twenty image portions immediately preceding the image portion containing the first portion of the preferred feature are included in the composite image and all data prior to that is ignored. At step 217 the second portion of the preferred feature is located within an image portion, and composite image construction continues for an additional twenty image portions. Accordingly, the composite image includes the feature of interest and approximately 200 rows of pixels above and below the feature. The image within the buffer is cropped 218—extraneous data is ignored or deleted—the composite image is provided 219 as the output image. Advantageously, the spatial relationship between the first portion of the preferred feature and the second portion of the preferred feature is known, which further facilitates composite image construction.

The above exemplary embodiments refer to image resolution and providing data relating to an area of interest. It is preferable, however, that the swipe fingerprint scanner according to the invention be flexible and be able to output any of a number of image formats and sizes at locations relative to a known extracted feature. Alternatively, the extracted feature is also selectable from a number of features. Further alternatively, the fingerprint imager first provides data indicative of identified features and image size and resolution.

The host system then provides to the imager a set of parameters relating to the data received—for example, 200 pixels above the core, 200 pixels below, 200 pixels to the right, and 200 pixels to the left—which allows the imager to determine the area of interest. This provides significant flexibility for the host system recognition process and for the imager's potential applications.

According to another aspect of the instant invention, an authorized user, such as for instance a system administrator, configures the system (scanner/software) according to pre-ferred priorities. In this way, the user specifies the desired identifiers. For example, the user selects the feature type of the feature of interest. Some non-limiting examples of feature types include: the fingerprint core; the top crease; six closest minutia, etc. Further, the user selects the location and/or orientation for displaying the feature of interest within the output image. In this way, the system provides a fingerprint composite that meets all of the requirements specified by the user. Optionally, the user provides the image evaluation criteria. For example, the user specifies that the first 30 pixel columns and rows immediately adjacent the feature of interest must be 100% populated, the next 30 rows and columns must be at least 80% populated, the next 30 rows and columns must be at least 50% populated, etc. If it is determined that the image evaluation criteria is not satisfied, then the image is rejected and a new image is acquired. Preferably, the user specified parameters are provided to the system via the data input/output port 5 and are retrievably stored within the memory buffer 3. Optionally, the preferences are retrievably stored within a not illustrated non-volatile memory of the swipe scanner 1. The non-volatile memory also optionally stores imager software for execution by the processor 4. Further optionally, the preferences are stored in a not illustrated volatile memory in communication with the processor 4.

Preferably, the above-described processing is performed within the imager, or using imager software, such that the processing required by the correlation software is reduced. Advantageously, the output image provided by the system is universal in nature, for example, each application can specify the size and/or other attributes of the output image.

Figure 14:
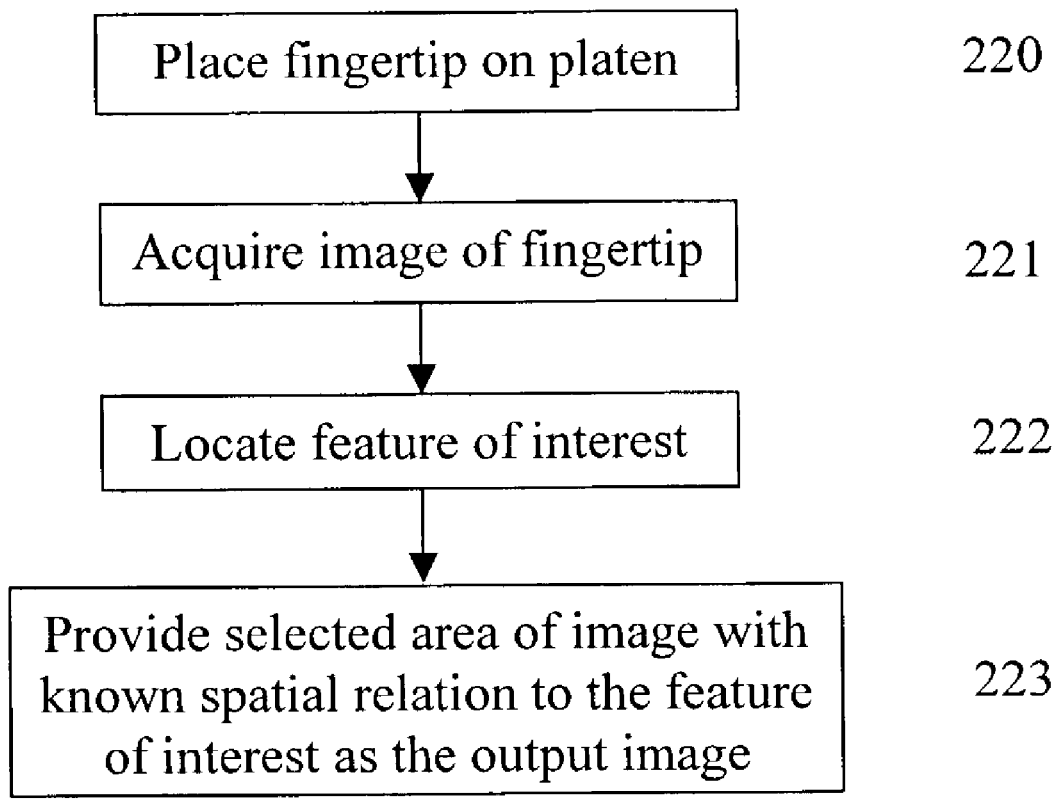

The above examples refer to fingerprint imaging but are equally applicable to other contact based biometric imaging including palm scanning and skin imaging in general. In particular, adoption of the instant invention for use with different biometric imaging devices facilitates processing of biometric information captured. Referring now to FIG. 14, shown is a method of imaging a biological information source according to the instant invention, using a contact imaging device of the type disclosed by Borza in U.S. Pat. No. 5,778,089. At step 220 a user places a fingertip on a platen of the contact imaging device, and at step 221 an image of the entire fingertip is acquired while the fingertip is held approximately stationary. At step 222 the feature of interest is located and at step 223 a selected area is defined about the feature of interest to define a fingerprint image having a resolution according to design requirements. The selected area is provided as the output image from the contact imaging device.

Numerous other embodiments may be envisaged without departing from the spirit and scope of the invention.

What is claimed is:

1. A method of imaging a fingerprint comprising the steps of:

sensing a fingerprint with a swipe contact imager to provide biometric image data;

analyzing a ridge-and-trough pattern of the biometric image data to determine a location of at least a repeatably identifiable feature within the ridge-and-trough pattern of the sensed biometric information within the biometric image data;

constructing a composite image from a plurality of overlapping image portions sensed by the swipe contact imager, wherein the composite image comprises the biometric image data including the at least a repeatably identifiable feature, wherein said constructing of a composite image is performed during a same overlapping period of time as said analyzing of the biometric image data; and providing an image of a known size that contains only a portion of the ridge-and-trough pattern and excludes another portion of the ridge-and-trough pattern of the biometric image data, the provided image sensed at contiguous locations of the fingerprint near the determined location of the at least a repeatably identifiable feature.

2. A method according to claim 1, wherein the at least a repeatably identifiable feature is a core of the fingerprint.

3. A method of imaging a fingerprint comprising the steps of:

sensing a fingerprint to provide biometric image data:

receiving data indicative of a type of repeatably identifiable feature within the biometric image data from a host processor;

analyzing a ridge-and-trough pattern of the biometric image data to determine a location of the at least a repeatably identifiable feature within the ridge-and-trough pattern of the sensed biometric information within the biometric image data; and providing an image of a known size that contains only a portion of the rid ge-and-trough pattern and excludes another portion of the ridge-and-trough pattern of the biometric image data, the provided image sensed at contiguous locations of the fingerprint near the determined location of the at least a repeatably identifiable feature.

4. A method according to claim 3, wherein the at least a repeatably identifiable feature is a type of feature selected from a group including: a core; a crease; a delta; and an area of high minutia point density.

5. A method according to claim 3, wherein the host processor receives identification information relating to a known individual and wherein the data indicative of the type of feature is associated with template data relating to the known individual.

6. A method according to claim 3, wherein the step of providing an image of a known size comprises a step of cropping the biometric image data, wherein cropping means one of i) deleting biometric image data at image locations outside of a selected regular shaped area, and ii) virtually "deleting" biometric image data at image locations outside of the selected regular shaped area by merely eliminating such data from a frame of consideration.

7. A method according to claim 6, wherein the step of providing an image of a known size including the step of cropping comprises the steps of:

selecting a regular shaped area having a known spatial relation to the location of the at least a repeatably identifiable feature;

cropping biometric image data other than the biometric image data within the regular shaped area; and, providing the cropped biometric image data within the regular shaped area as the image of a known size.

8. A method according to claim 7, wherein the selected regular shaped area includes a predetermined image area along a predetermined direction relative to the location of the at least a repeatably identifiable feature.

9. A method according to claim 6, wherein the step of providing an image of a known size including the step of cropping comprises the steps of:

selecting a regular shaped area having a known spatial relation to the location of the at least a repeatably identifiable feature;

cropping biometric image data other than the biometric image data within the regular shaped area;

analyzing the biometric image data within the regular shaped area to determine portions of the regular shaped area for which biometric image data was not captured;

determining a value relating to the determined portions;

comparing the determined value to a threshold value; and when the determined value is i) within the threshold value, providing the biometric image data within the regular shaped area as the image of a known size less and ii) outside the threshold value, requesting additional data relating to sensed biometric information.

10. A method according to claim 6, wherein the step of providing an image of a known size including the step of cropping comprises the steps of:
    selecting a regular shaped area having a known spatial relation to the location of the at least a repeatably identifiable feature;
    cropping biometric image data other than the biometric image data within the regular shaped area;
    scaling the biometric image data within the regular shaped area; and
    providing the scaled biometric image data within the regular shaped area as the image of a known size.

11. A method of imaging a fingerprint comprising the steps of:
    sensing a plurality of images of a same fingerprint;
    aligning the sensed images one relative to another to form a composite image of the fingerprint;
    analyzing a ridge-and-trough pattern of at least one of the composite image and the plurality of images to determine a location of a repeatably identifiable feature within the ridge-and-trough pattern, wherein said aligning of the sensed images is performed during a same overlapping period of time as said analyzing of the composite image and the plurality of images; and
    providing a known amount of image data relating to only a portion of the ridge-and-trough pattern and excluding another portion of the ridge-and-trough pattern of the composite image data at locations relative to the location of the repeatably identifiable feature as the composite image data.

12. A method according to claim 11, wherein a swipe contact imager is used to sense the plurality of images.

13. A method according to claim 11, wherein the repeatably identifiable feature is selected from a group comprising: a core; a crease; a delta; and an area of high minutia point density.

14. A method according to claim 11, wherein the step of providing a known amount of image data comprises the step of:
    selecting an image area about the location of the repeatably identifiable feature, the selected area including the known amount of image data at locations relative to the location of the repeatably identifiable feature;
    cropping image data other than the known amount of image data within the selected area; and
    providing the known amount of image data within the selected area as the composite image data.

15. A method according to claim 11, comprising the steps of:
    in dependence upon determining the location of the repeatably identifiable feature during the same overlapping period of time, selecting an image area about the repeatably identifiable feature, the selected area including the known amount of image data at locations relative to the location of the repeatably identifiable feature;
    cropping image data other than the image data within the selected area; and
    continuing to align the sensed images one relative to another to form a composite image of the selected area of the biological surface.

16. A method of imaging a fingerprint comprising the steps of:
    sensing a plurality of images of a same fingerprint;
    analyzing a ridge-and-trough pattern of the plurality of images to determine a location of a repeatably identifiable feature within the ridge-and-trough pattern;
    cropping the sensed images;
    aligning the cropped images one relative to another to form a composite image of the fingerprint; and
    providing a known amount of image data relating to only a portion of the ridge-and-trough pattern and excluding another portion of the ridge-and-trough pattern of the composite image data at locations relative to the location of the repeatably identifiable feature as the composite image data.

17. A swipe fingerprint scanner comprising:
    a sensor for sensing a plurality of images of a same fingerprint;
    a memory in communication with the sensor, for retrievably storing each image of the plurality of images;
    a processor in communication with the sensor and with the memory, the processor programmed for aligning the sensed images one relative to another to form a composite image of the fingerprint, for analyzing a ridge-and-trough pattern of the composite image to determine at least a location of a repeatably identifiable feature within the ridge-and-trough pattern, wherein said aligning of the sensed images is performed during a same overlapping period of time as said analyzing of the composite image and, for providing a known amount of image data relating to only a portion of the ridge-and-trough pattern and excluding another portion of the ridge-and-trough pattern of the composite image data at locations relative to the determined location of the repeatably identifiable feature as output image data; and
    a data input/output port in communication with the processor, for receiving the output image data therefrom, and for providing the output image data to a processor external to the swipe fingerprint scanner.

18. A swipe fingerprint scanner according to claim 17, wherein the sensor comprises:
    a first sensing pad, having a specific capacitive detective area, for sensing variation in a fingerprint; and
    a second sensing pad for detecting motion of the sensed variation.

19. A swipe fingerprint scanner according to claim 18, wherein the first sensing pad is disposed adjacent to the second sensing pad in a spaced apart and substantially parallel alignment.

20. A swipe fingerprint scanner according to claim 18, wherein the first sensing pad and the second sensing pad comprise a multi-directional swipe fingerprint scanner.

21. A swipe fingerprint scanner according to claim 18, wherein the first sensing pad and the second sensing pad is a unified sensing pad.

22. A computer readable medium having stored thereon instructions that when processed by a processing device cause the processing device to image a fingerprint by performing the steps of:
    receiving biometric image data representing a fingerprint;
    analyzing a ridge-and-trough pattern of the biometric image data to determine a location of at least a repeatably identifiable feature within the ridge-and-trough pattern of the sensed biometric information within the biometric image data;
    constructing a composite image from a plurality of overlapping image portions sensed by the swipe contact imager, wherein the composite image comprises the biometric image data including the at least a repeatably identifiable feature, wherein said constructing of a composite image is performed during a same overlapping period of time as said analyzing of the biometric image data; and providing an image of a known size that contains only a portion of the ridge-and-trough pattern and excludes another portion of the ridge-and-trough pattern of the biometric image data, the provided image sensed at contiguous locations of the fingerprint near the determined location of the at least a repeatably identifiable feature.

23. A computer readable medium having stored thereon instructions that when processed by a processing device cause the processing device to image a fingerprint by performing the steps of:

receiving biometric image data representing a fingerprint;

receiving data indicative of a type of repeatably identifiable feature within the biometric image data from a host processor;

analyzing a ridge-and-trough pattern of the biometric image data to determine a location of the at least a repeatably identifiable feature within the ridge-and-trough pattern of the sensed biometric information within the biometric image data; and providing an image of a known size that contains only a portion of the ridge-and-trough pattern and excludes another portion of the ridge-and-trough pattern of the biometric image data, the provided image sensed at contiguous locations of the fingerprint near the determined location of the at least a repeatably identifiable feature.

24. A computer readable medium according to claim 23, wherein the step of providing an image of a known size comprises a step of cropping the biometric image data, wherein cropping means one of i) deleting biometric image data at image locations outside of a selected regular shaped area, and ii) virtually "deleting" biometric image data at image locations outside of the selected regular shaped area by merely eliminating such data from a frame of consideration.

25. A computer readable medium according to claim 24, wherein the step of providing an image of a known size including the step of cropping comprises the steps of:

selecting a regular shaped area having a known spatial relation to the location of the at least a repeatably identifiable feature;

cropping biometric image data other than the biometric image data within the regular shaped area; and providing the cropped biometric image data within the regular shaped area as the image of a known size.

26. A computer readable medium according to claim 25, wherein the selected regular shaped area includes a predetermined image area along a predetermined direction relative to the location of the at least a repeatably identifiable feature.

27. A computer readable medium according to claim 24, wherein the step of providing an image of a known size including the step of cropping comprises the steps of:

selecting a regular shaped area having a known spatial relation to the location of the at least a repeatably identifiable feature;

cropping biometric image data other than the biometric image data within the regular shaped area;

analyzing the biometric image data within the regular shaped area to determine portions of the regular shaped area for which biometric image data was not captured;

determining a value relating to the determined portions;

comparing the determined value to a threshold value; and when the determined value is i) within the threshold value, providing the biometric image data within the regular shaped area as the image of a known size less and ii) outside the threshold value, requesting additional data relating to sensed biometric information.

28. A computer readable medium according to claim 24, wherein the step of providing an image of a known size including the step of cropping comprises the steps of:

selecting a regular shaped area having a known spatial relation to the location of the at least a repeatably identifiable feature;

cropping biometric image data other than the biometric image data within the regular shaped area;

scaling the biometric image data within the regular shaped area; and providing the scaled biometric image data within the regular shaped area as the image of a known size.

29. A computer readable medium having stored thereon instructions that when processed by a processing device cause the processing device to image a fingerprint by performing the steps of:

receiving biometric image data representing a plurality of images of a same fingerprint;

aligning the sensed images one relative to another to form a composite image of the fingerprint;

analyzing a ridge-and-trough pattern of at least one of the composite image and the plurality of images to determine a location of a repeatably identifiable feature within the ridge-and-trough pattern, wherein said aligning of the sensed images is performed during a same overlapping period of time as said analyzing of the composite image and the plurality of images; and providing a known amount of image data relating to only a portion of the ridge-and-trough pattern and excluding another portion of the ridge-and-trough pattern of the composite image data at locations relative to the location of the repeatably identifiable feature as the composite image data.

30. A computer readable medium according to claim 29, wherein the step of providing a known amount of image data comprises the step of:

selecting an image area about the location of the repeatably identifiable feature, the selected area including the known amount of image data at locations relative to the location of the repeatably identifiable feature;

cropping image data other than the known amount of image data within the selected area; and providing the known amount of image data within the selected area as the composite image data.

31. A computer readable medium according to claim 29, further comprising instructions that when processed by the processing device cause the processing device to perform the steps of:

in dependence upon determining the location of the repeatably identifiable feature during the same overlapping period of time, selecting an image area about the repeatably identifiable feature, the selected area including the known amount of image data at locations relative to the location of the repeatably identifiable feature;

cropping image data other than the image data within the selected area; and continuing to align the sensed images one relative to another to form a composite image of the selected area of the biological surface.

32. A computer readable medium having stored thereon instructions that when processed by a processing device cause the processing device to image a fingerprint by performing the steps of:

receiving biometric image data representing a plurality of images of a same fingerprint;

analyzing a ridge-and-trough pattern of the plurality of images to determine a location of a repeatably identifiable feature within the ridge-and-trough pattern;

cropping the sensed images;

aligning the cropped images one relative to another to form a composite image of the fingerprint; and providing a known amount of image data relating to only a portion of the ridge-and-trough pattern and excluding another portion of the ridge-and-trough pattern of the composite image data at locations relative to the location of the repeatably identifiable feature as the composite image data.

* * * * *

UNITED STATES PATENT AND TRADEMARK OFFICE
CERTIFICATE OF CORRECTION

PATENT NO. : 7,203,347 B2 Page 1 of 1
APPLICATION NO. : 10/155004
DATED : April 10, 2007
INVENTOR(S) : Laurence Hamid It is certified that error appears in the above-identified patent and that said Letters Patent is hereby corrected as shown below:

<u>Column 3,</u>
Line 47, after "contemplated" insert -- for --.

<u>Column 14,</u>
Line 11, delete "rid ge-and-trough" and insert -- ridge-and-trough --.

Signed and Sealed this

Twenty-ninth Day of April, 2008

JON W. DUDAS
*Director of the United States Patent and Trademark Office*